United States Patent
Nuzzio

(10) Patent No.: US 6,563,571 B1
(45) Date of Patent: May 13, 2003

(54) DEUTERIUM/TUNGSTEN LIGHT SOURCE ARRANGEMENT

(75) Inventor: Donald B. Nuzzio, Ringoes, NJ (US)

(73) Assignee: Analytical Instrument Systems, Inc., Flemington, NJ (US)

( * ) Notice: Subject to any disclaimer, the term of this patent is extended or adjusted under 35 U.S.C. 154(b) by 0 days.

(21) Appl. No.: 09/378,025

(22) Filed: Aug. 20, 1999

Related U.S. Application Data

(60) Provisional application No. 60/097,469, filed on Aug. 21, 1998.

(51) Int. Cl.$^7$ .................................................. G01J 3/10
(52) U.S. Cl. ........................ 356/51; 356/300; 250/373
(58) Field of Search .......................... 356/51, 300, 319, 356/323, 325, 326, 328; 250/339.05, 339.06, 339.07, 372, 373

(56) References Cited

U.S. PATENT DOCUMENTS 4,060,327 A * 11/1977 Jacobowitz et al. ........ 356/328

FOREIGN PATENT DOCUMENTS

JP 59-135332 * 8/1984

\* cited by examiner

*Primary Examiner*—F. L. Evans
(74) *Attorney, Agent, or Firm*—Rohm & Monsanto, PLC

(57) ABSTRACT

A light source arrangement for conducting spectroscopic analysis of a material to be analyzed has a first source of electromagnetic energy for issuing a first source electromagnetic energy having a first predetermined spectroscopic characteristic and a second source of electromagnetic energy for issuing a second source electromagnetic energy having a second predetermined spectroscopic characteristic. The light source arrangement is provided with a first port for emitting an output electromagnetic energy having an output spectral characteristic responsive to a selectable combination of the first and second predetermined spectroscopic characteristics. A holder secures the material to be analyzed in a first path of propagation of the output electromagnetic energy. A third port emits a first test electromagnetic energy having a first test spectral characteristic responsive to an interaction between the output electromagnetic energy and the material to be analyzed. Amplitude of the light is controlled by a first diaphragm disposed in the path of propagation of the output electromagnetic energy intermediate of the first port and the holder for the material being analyzed. A first filter imparts a first filter spectral characteristic to the output electromagnetic energy, and is disposed in the path of propagation of the output electromagnetic energy intermediate of the first port and the holder.

18 Claims, 3 Drawing Sheets

FIG. 2
FIG. 3
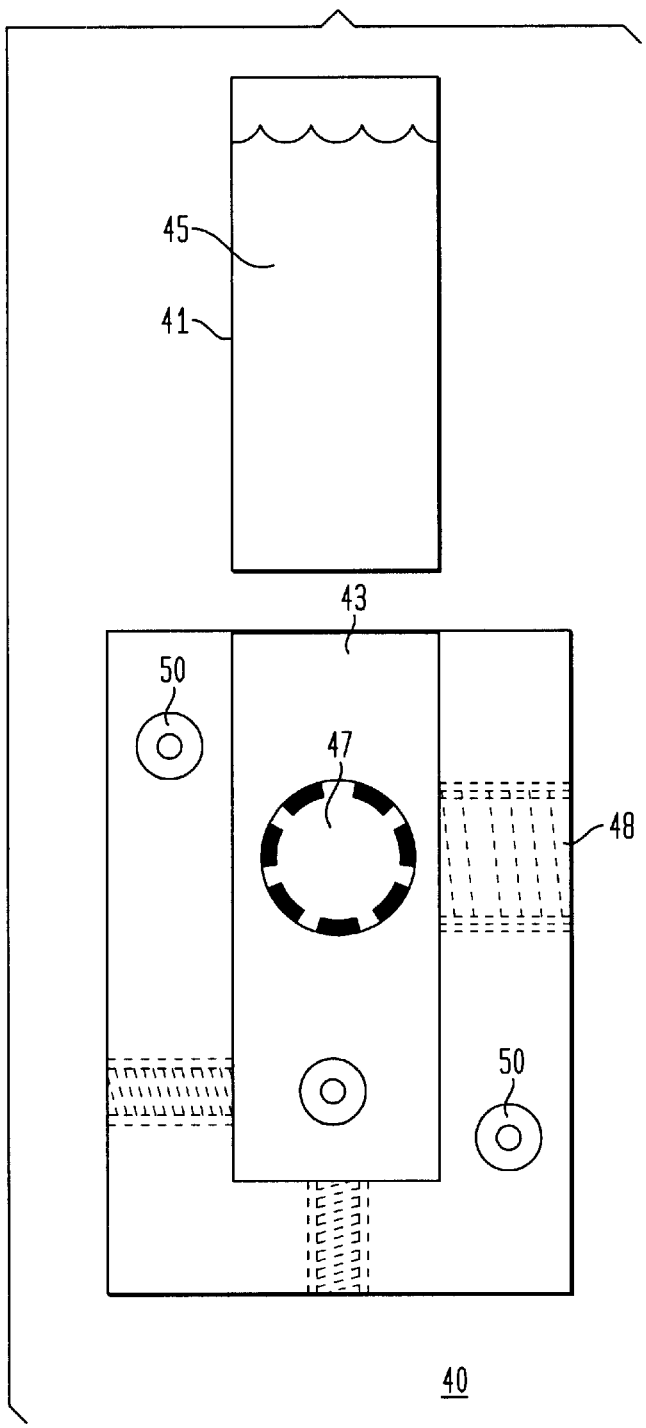
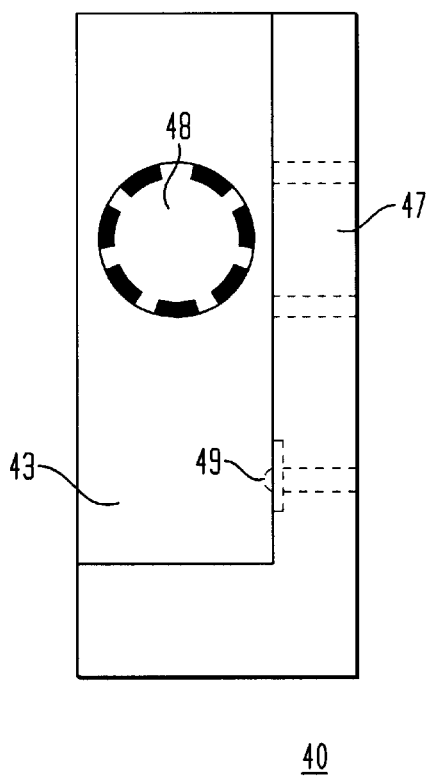

US 6,563,571 B1

DEUTERIUM/TUNGSTEN LIGHT SOURCE ARRANGEMENT

CROSS-REFERENCE TO RELATED APPLICATION

This application claims the benefit of U.S. Provisional Application No. 60/097,469 filed on Aug. 21, 1998.

BACKGROUND OF THE INVENTION

1. Field of the Invention

This invention relates generally to light sources for spectroscopy and other scientific applications, and more particularly, to a light source that provides visual and ultraviolet electromagnetic energy individually and in selectable combinations of frequency and amplitude characteristics.

2. Description of the Prior Art

There is often a need to conduct spectroscopic analysis on a sample material using more than one for of exciting electromagnetic energy. This is generally require that the electromagnetic energy source be changed, causing displacement of the sample and delay. There is a need for, and it is accordingly an object of the invention to provide, an arrangement that permits spectroscopic analysis to be conducted using visual and ultraviolet electromagnetic energy individually (i.e., sequentially) and simultaneously in selectable combinations of frequency and amplitude characteristics.

It is additionally desired to conduct spectroscopic analysis of two sample materials simultaneously. It is there fore an object to the invention to provide an arrangement that facilitates the application of different combinations of visual and ultraviolet electromagnetic energy simultaneously to different samples of materials, using the same sources of electromagnetic energy.

SUMMARY OF THE INVENTION

The foregoing and other objects are achieved by this invention which provides, in accordance with a first apparatus aspect, a light source arrangement for conducting spectroscopic analysis of a material to be analyzed. The light source arrangement has a first source of electromagnetic energy for issuing a first source electromagnetic energy having a first predetermined spectroscopic characteristic and a second source of electromagnetic energy for issuing a second source electromagnetic energy having a second predetermined spectroscopic characteristic. The light source arrangement is provided with a first port for emitting an output electromagnetic energy having an output spectral characteristic responsive to a selectable combination of the first and second predetermined spectroscopic characteristics. A holder secures the material to be analyzed in a first path of propagation of the output electromagnetic energy. A third port emits a first test electromagnetic energy having a first test spectral characteristic responsive to an interaction between the output electromagnetic energy and the material to be analyzed.

In one embodiment, the light source arrangement is further provided with a first amplitude controller for controlling the amplitude of the output electromagnetic energy. The first amplitude controller is disposed in the path of propagation of the output electromagnetic energy intermediate of the first port and the holder for the material being analyzed.

In other embodiments, the light source arrangement has a first filter for imparting a first filter spectral characteristic to the output electromagnetic energy. The first filter is disposed in the path of propagation of the output electromagnetic energy intermediate of the first port and the holder.

In still further embodiments, the light source arrangement is further provided with a second amplitude controller for controlling the selectable combination of the first and second predetermined spectroscopic characteristics. The second amplitude controller is disposed in the path of propagation intermediate of the first and second sources of electromagnetic energy.

In some embodiments, the light source arrangement has yet a third filter for imparting a third filter spectral characteristic to the output electromagnetic energy. The third filter is disposed in the path of propagation intermediate of the first and second sources of electromagnetic energy.

In a particularly advantageous embodiment of the invention, the light source arrangement is further provided with a second port for emitting a second output electromagnetic energy having a second output spectral characteristic responsive to a second selectable combination of the first and second predetermined spectroscopic characteristics. The second port is, in some embodiments, distal from the first port. The first port is preferably disposed in the vicinity of the first source of electromagnetic energy, and the second port is in the vicinity of the second source of electromagnetic energy. In some embodiments, the first and second ports are coaxially disposed so that the first and second paths of propagation are directed coaxially in opposition to each other.

In this embodiment, there is a second holder for holding a further material to be analyzed in a second path of propagation of the second output electromagnetic energy. There is also provided a fourth port for emitting a second test electromagnetic energy having a second test spectral characteristic responsive to an interaction between the second output electromagnetic energy and the further material to be analyzed. In some embodiments of this aspect of the invention, a second filter imparts a second filter spectral characteristic to the second output electromagnetic energy, the second filter being disposed in the second path of propagation of the second output electromagnetic energy intermediate of the second port and the second holder for the further material to be analyzed.

This further embodiments, a third amplitude controller controls the amplitude of the second output electromagnetic energy. The third amplitude controller is disposed in the path of propagation of the second output electromagnetic energy intermediate of the second port and the second holder.

In accordance with another apparatus aspect of the invention, there is provided a light source arrangement for conducting spectroscopic analysis. A first source of electromagnetic energy issues a first source electromagnetic energy having a first predetermined spectroscopic characteristic. A second source of electromagnetic energy is provided for issuing a second source electromagnetic energy having a second predetermined spectroscopic characteristic. A first port is provided for emitting a first output electromagnetic energy having an output spectral characteristic responsive to a first selectable combination of the first and second predetermined spectroscopic characteristics, and a second port emits a second output electromagnetic energy having an output spectral characteristic responsive to a second selectable combination of the first and second predetermined spectroscopic characteristics. There is additionally provided a first holder for holding a first material to be analyzed in a first path of propagation of the first output electromagnetic energy, and a second holder for holding a second material to be analyzed in a second path of propagation of the second output electromagnetic energy. A third port emits a first test electromagnetic energy having a first test spectral characteristic responsive to an interaction between the first output electromagnetic energy and the first material to be analyzed. Additionally, a fourth port emits a second test electromagnetic energy having a second test spectral characteristic responsive to an interaction between the second output electromagnetic energy and the second material to be analyzed.

In one embodiment of this further aspect of the invention, the first source of electromagnetic energy is a deuterium source, and the second source of electromagnetic energy is a tungsten source. An amplitude controller arranged intermediate of the first and second sources of electromagnetic energy.

In a further embodiment, there is further provided a filter arranged intermediate of the first and second sources of electromagnetic energy. A first output filter is arranged intermediate of the first port and the first source of electromagnetic energy. Also, a second output filter arranged intermediate of the second port and the second source of electromagnetic energy.

BRIEF DESCRIPTION OF THE DRAWING

Comprehension of the invention is facilitated by reading the following detailed description, in conjunction with the annexed drawing, in which:

FIG. 2 is a representation of a cuvette holder that is suitable for use in combination with the embodiment of FIG. 1, and a cuvette for installation therein;

FIG. 3 is a side view of the cuvette holder of FIG. 2; and

DETAILED DESCRIPTION

Figure 1:
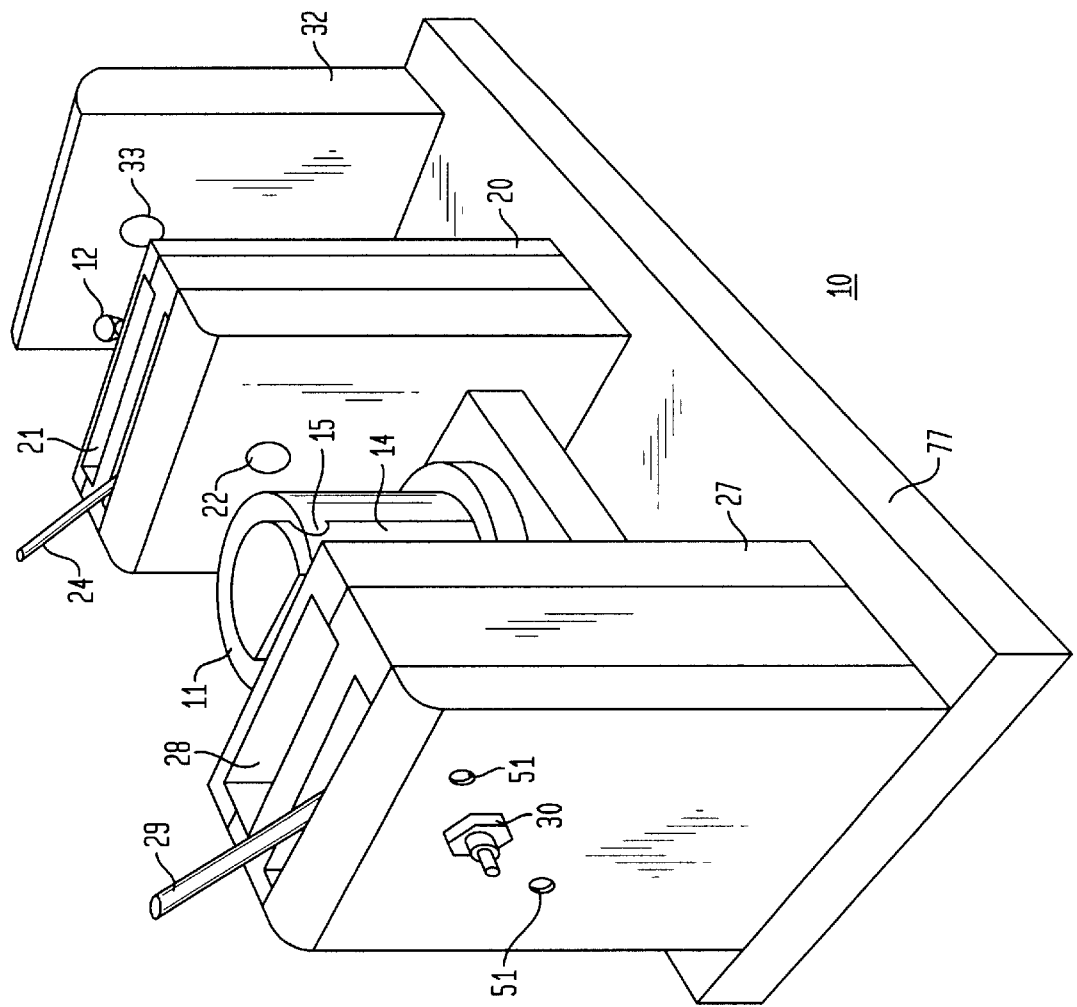
FIG. 1 is a simplified schematic perspective representation of a specific embodiment of the invention with a cover thereover having been removed.
Figure 4:
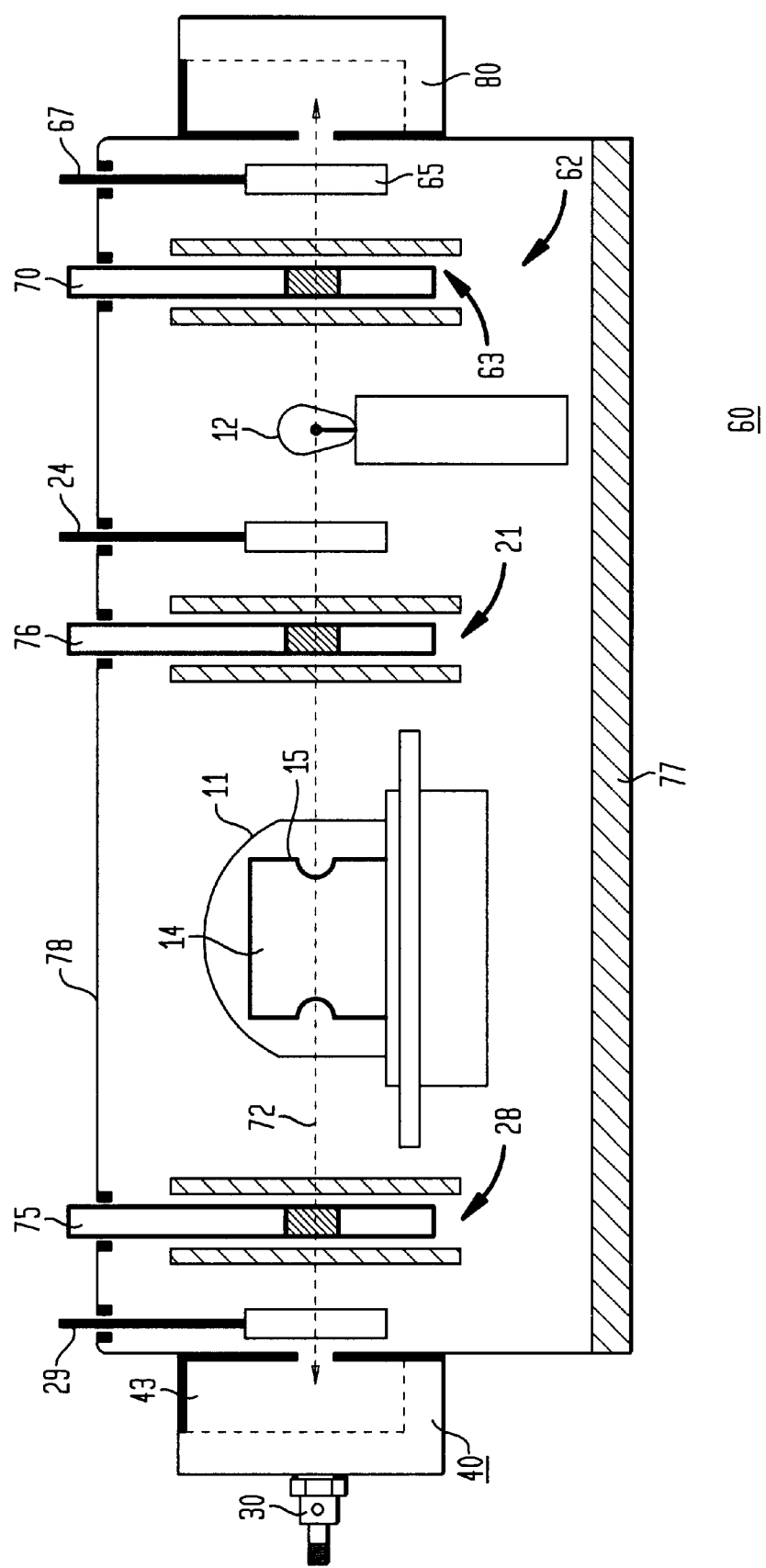
FIG. 4 is a partially schematic side representation of a further embodiment of the invention

FIG. 1 is a perspective representation of a specific illustrative embodiment of a light source 10 constructed in accordance with the principles of the invention. Light source 10 is provided with a deuterium lamp 11 and a tungsten lamp 12. Deuterium lamp 11 is of the type that issues ultraviolet electromagnetic energy and has an anode 14. Anode 14 is shown to have an aperture 15 therethrough that, as will be shown below with respect to FIG. 4, is aligned with the optical path (not shown in this drawing). In this embodiment of the invention, anode aperture 15 has a diameter of approximately 2 mm.

In this specific illustrative embodiment of the invention, there is shown interposed between deuterium lamp 11 and tungsten lamp 12, a support assembly 20. Support assembly 20 is provided with a filter slot 21 that accommodates a filter (not shown in this figure) that will impart to the light passing therethrough a predetermined chromatic characteristic. In addition, support assembly 20 has an iris diaphragm (not shown in this figure) that is arranged in registration with a light path aperture 22 of the support assembly and is controllable by actuation of an iris diaphragm control handle 24. The iris diaphragm controlled by control handle 24 is of a commercially available type, and preferably is of the type having an aperture therethrough that can be controlled to total closure, i.e., zero aperture upon actuation of the iris diaphragm handle.

FIG. 1 further shows an additional support assembly 27 having an associated filter slot 28 and an iris diaphragm control handle 29 for controlling an iris diaphragm similar to that described hereinabove with respect to iris diaphragm control handle 24.

In this embodiment, the corresponding light path aperture of support assembly 27 is terminated with a fiber optic connector 30 for attachment of a fiber optic cable (not shown) in a conventional manner. It is to be understood that the light path aperture of support assembly 27 need not be terminated in a connector, as the invention is useable in open beam path applications. However, when an optical fiber connecter is used, it may be of any known type, including the collimator type that has incorporated therein a lens, or a conventional SMA connector.

On the other side of tungsten lamp 12 from support assembly 20 there is provided a support 32 having a light path aperture 33 therethrough. As will be described below, support 32 may be replaced, in other embodiments of the invention, with a support assembly, such as support assembly 20 or 27, which permits control over the quantity of light propagated through light path aperture 33 and its chromatic characteristic.

FIG. 2 is a representation of a cuvette holder 40 and a cuvette 41 that is accommodated in a region 43 of cuvette holder 40. Cuvette 41 contains therewithin a test fluid 45 that will be subjected to analysis, such as spectroscopic analysis. Cuvette holder 40 has an aperture 47 for accommodating a connector, as previously described hereinabove with respect to fiber optic connector 30 on support assembly 27 on FIG. 1. In the cuvette holder of FIG. 2, aperture 47 is coaxially arranged with respect to the optical path through the cuvette, and therefore, is useful for performing absorption studies. In addition, there is provided in this specific illustrative embodiment of the invention a spring-loaded element 49 that urges the cuvette against support assembly 27, there by ensuring it does not vibrate or otherwise move during the analysis, and yet permits easy removal of the cuvette.

FIG. 3 is a side representation of cuvette holder 40 of FIG. 2. FIGS. 2 and 3 show an additional aperture 48 for accommodating a further fiber optic connector (not shown in this figure) and which is orthogonal to the optical axis. This aperture, therefore, is useful in the performance of fluorescence studies.

Cuvette holder 40 is provided with a pair of mounting holes 50 that, in this embodiment, are shown to be countersunk for accommodating a flat head mounting screw (not shown). Mounting holes 50 are arranged to register with holes 51 on support assembly 27 in FIG. 1. As will be shown schematically in FIG. 4, a housing cover is arranged over light source 10, and in some embodiments, will be interposed between cuvette holder 40 and support assembly 27. In such embodiments, the housing will be provided with corresponding holes to facilitate the mounting of the cuvette holder, as well as an aperture disposed substantially coaxially with the light path.

FIG. 4 is a simplified schematic representation of a further embodiment of the invention. Elements of structure that have previously been discussed are similarly designated. As shown, a light source 60 has a deuterium lamp 11 and a tungsten lamp 12 for providing ultraviolet and visible forms of electromagnetic energy, as previously described. In this embodiment, instead of a support 32, there is provided an additional support assembly that is designated schematically as 62. Support assembly 62 has a filter slot 63 and an iris diaphragm 65 having an aperture (not shown) that is controlled by iris diaphragm control handle 67. There is additionally provided a filter 70 that is accommodated within filter slot 63 for adding a predetermined chromatic characteristic to the light that is propagated along light path 72. This figure shows further filters 75 and 76 disposed within filter slots 28 and 21, respectively. The entirety of the assembly is installed on a support base 77 and covered by a light-tight housing cover 78.

This embodiment of the invention is further provided with an additional cuvette holder 80 that is similar, if not identical to cuvette holder 40.

It can be seen that the invention provides facility for conducting spectroscopic analyses using ultraviolet or visible electromagnetic energy, as well as combinations thereof.

Heat that accumulates within housing cover 78 can be extracted by ventilation or by installing a heat sink (not shown) on the housing cover.

Although the invention has been described in terms of specific embodiments and applications, persons skilled in the art can, in light of this teaching, generate additional embodiments without exceeding the scope or departing from the spirit of the disclosed invention. Accordingly, it is to be understood that the drawing and description in this disclosure are proffered to facilitate comprehension of the invention, and should not be construed to limit the scope thereof.

What is claimed is:

1. A light source arrangement for conducting spectroscopic analysis of a material to be analyzed, the light source arrangement comprising:
    a first source of electromagnetic energy, said first source issuing a first source electromagnetic energy having a first predetermined spectroscopic characteristic;
    a second source of electromagnetic energy, said second source issuing a second source electromagnetic energy having a second predetermined spectroscopic characteristic;
    a first port for emitting an output electromagnetic energy having an output spectral characteristic responsive to a selectable combination of said first and second predetermined spectroscopic characteristics;
    a holder for holding the material to be analyzed in a first path of propagation of the output electromagnetic energy;
    a second port for emitting a second output electromagnetic energy having a second output spectral characteristic responsive to a second selectable combination of said first and second predetermined spectroscopic characteristics; and
    a third port for emitting a first test electromagnetic energy having a first test spectral characteristic responsive to an interaction between the output electromagnetic energy and the material to be an analyzed.

2. The light source arrangement of claim 1, wherein there is further provided a first amplitude controller for controlling an amplitude of the output electromagnetic energy, said first amplitude controller being disposed in a path of propagation of the output electromagnetic energy intermediate of said first port and said holder.

3. The light source arrangement of claim 1, wherein there is further provided a first filter for imparting a first filter spectral characteristic to the output electromagnetic energy, said first filter being disposed in a path of propagation of the output electromagnetic energy intermediate of said first port and said holder.

4. The light source arrangement of claim 1, wherein there is further provided an amplitude controller for controlling the selectable combination of the first and second predetermined spectroscopic characteristics, said amplitude controller being disposed in a path of propagation intermediate of said first and second sources of electromagnetic energy.

5. The light source arrangement of claim 1, wherein there is further provided an output filter for imparting an output filter spectral characteristic to the output electromagnetic energy, said output filter being disposed in a path of propagation intermediate of said first and second sources of electromagnetic energy.

6. The light source arrangement of claim 1, wherein there is further provided:
    a second holder for holding a further material to be analyzed in a second path of propagation of the second output electromagnetic energy; and
    a fourth port for emitting a second test electromagnetic energy having a second test spectral characteristic responsive to an interaction between the second output electromagnetic energy and the further material to be analyzed.

7. The light source arrangement of claim 6, wherein there is further provided a second-output filter for imparting a predetermined filter spectral characteristic to the second output electromagnetic energy, said second-output filter being disposed in a path of propagation of the second output electromagnetic energy intermediate of said second port and said second holder.

8. The light source arrangement of claim 6, wherein said second port is disposed distal from said first port.

9. The light source arrangement of claim 8, wherein said first port is disposed in the vicinity of said first source of electromagnetic energy, and said second port is disposed in the vicinity of said second source of electromagnetic energy.

10. The light source arrangement of claim 8, wherein said first and second ports are coaxially disposed, whereby the first and second paths of propagation are directed coaxially in opposition to each other.

11. The light source arrangement of claim 6, wherein there is further provided an amplitude controller for controlling an amplitude of the second output electromagnetic energy, said amplitude controller being disposed in a path of propagation of the second output electromagnetic energy intermediate of said second port and said second holder.

12. A light source arrangement for conducting spectroscopic analysis, the light source arrangement comprising:
    a first source of electromagnetic energy, said first source issuing a first source electromagnetic energy having a first predetermined spectroscopic characteristic;
    a second source of electromagnetic energy, said second source issuing a second source electromagnetic energy having a second predetermined spectroscopic characteristic;
    a first port for emitting a first output electromagnetic energy having an output spectral characteristic responsive to a first selectable combination of said first and second predetermined spectroscopic characteristics;
    a second port for emitting a second output electromagnetic energy having an output spectral characteristic responsive to a second selectable combination of said first and second predetermined spectroscopic characteristics;
    a first holder for holding a first material to be analyzed in a first path of propagation of the first output electromagnetic energy;

a second holder for holding a second material to be analyzed in a second path of propagation of the second output electromagnetic energy;

a third port for emitting a first test electromagnetic energy having a first test spectral characteristic responsive to an interaction between the first output electromagnetic energy and the first material to be analyzed; and a fourth port for emitting a second test electromagnetic energy having a second test spectral characteristic responsive to an interaction between the second output electromagnetic energy and the second material to be analyzed.

13. The light source arrangement of claim 12, wherein said first source of electromagnetic energy is a deuterium source.

14. The light source arrangement of claim 12, wherein said second source of electromagnetic energy is a tungsten source.

15. The light source arrangement of claim 12, wherein there is further provided an amplitude controller arranged intermediate of said first and second sources of electromagnetic energy.

16. The light source arrangement of claim 12, wherein there is further provided a filter arranged intermediate of said first and second sources of electromagnetic energy.

17. The light source arrangement of claim 12, wherein there is further provided a first output filter arranged intermediate of said first port and said first source of electromagnetic energy.

18. The light source arrangement of claim 17, wherein there is further provided a second output filter arranged intermediate of said second port and said second source of electromagnetic energy.

* * * * *